US012795675B2

(12) United States Patent
Wang et al.

(10) Patent No.: US 12,795,675 B2
(45) Date of Patent: Nov. 10, 2026

(54) SOFT UPLINK GRANT

(71) Applicant: QUALCOMM Incorporated, San Diego, CA (US)

(72) Inventors: Xiaojie Wang, Hillsborough, NJ (US); Xiaoxia Zhang, San Diego, CA (US); Junyi Li, Fairless Hills, PA (US)

(73) Assignee: QUALCOMM INCORPORATED, San Diego, CA (US)

(*) Notice: Subject to any disclaimer, the term of this patent is extended or adjusted under 35 U.S.C. 154(b) by 1220 days.

(21) Appl. No.: 17/662,761

(22) Filed: May 10, 2022

(65) Prior Publication Data

US 2023/0371030 A1 Nov. 16, 2023

(51) Int. Cl.

| | |
|---|---|
| ***H04W 72/23*** | (2023.01) |
| ***H04L 5/00*** | (2006.01) |
| ***H04W 72/11*** | (2023.01) |
| ***H04W 72/21*** | (2023.01) |

(52) U.S. Cl.

CPC ........... *H04W 72/23* (2023.01); *H04L 5/0048* (2013.01); *H04W 72/11* (2023.01); *H04W 72/21* (2023.01)

(58) Field of Classification Search

None

See application file for complete search history.

(56) References Cited

U.S. PATENT DOCUMENTS

2013/0242911 A1* 9/2013 Heo .................... H04W 52/367 370/329
2018/0198894 A1* 7/2018 Nammi ................. H03M 13/09
2019/0349908 A1* 11/2019 Talarico ................ H04W 72/23
2020/0008228 A1* 1/2020 Lee ......................... H04L 5/001
2020/0274637 A1* 8/2020 Li ......................... H04L 5/0053
2021/0111838 A1* 4/2021 Utkovski .............. H04W 72/04
2021/0168762 A1* 6/2021 Huang ................. H04B 7/0456
2021/0315000 A1* 10/2021 Li ......................... H04L 5/0094
2021/0377976 A1* 12/2021 Karaki .................. H04W 16/16
2022/0116152 A1* 4/2022 Iyer ....................... H04L 1/1819
2022/0353877 A1* 11/2022 Wang ..................... H04W 72/23
2023/0337240 A1* 10/2023 Zhang ................. H04W 72/566

FOREIGN PATENT DOCUMENTS

KR 20190087747 A * 7/2019 ............ H04L 5/005

OTHER PUBLICATIONS

Author Unknown, Autonomous Uplink Transmission in NR Unlicensed, Doc. No. R2-1809382, pp. 1-5, Aug. 24 (Year: 2018).*
Author Unknown, HARQ for autonomous UL access on unlicensed SCell, Doc. No. R1-1712125, pp. 1-4, Aug. 25 (Year: 2017).*

* cited by examiner

*Primary Examiner* — Christopher M Crutchfield
(74) *Attorney, Agent, or Firm* — Harrity & Harrity, LLP

(57) ABSTRACT

Various aspects of the present disclosure generally relate to wireless communication. In some aspects, a user equipment (UE) may receive an uplink grant that schedules a communication in a scheduled resource and that includes first transmission parameters associated with the scheduled resource. The UE may select, in response to the uplink grant being a soft uplink grant, second transmission parameters that include new transmission parameters not included in the first transmission parameters or include modified first transmission parameters. The UE may transmit the communication in the scheduled resource or a subset of the scheduled resource using at least the second transmission parameters. Numerous other aspects are described.

28 Claims, 13 Drawing Sheets

400

SOFT UPLINK GRANT

FIELD OF THE DISCLOSURE

Aspects of the present disclosure generally relate to wireless communication and to techniques and apparatuses for using a soft uplink grant.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an uplink grant that schedules a communication in a scheduled resource and that includes first transmission parameters associated with the scheduled resource. The method may include selecting, in response to the uplink grant being a soft uplink grant, second transmission parameters that include new transmission parameters not included in the first transmission parameters or include modified first transmission parameters. The method may include transmitting the communication in the scheduled resource or a subset of the scheduled resource using at least the second transmission parameters.

Some aspects described herein relate to a method of wireless communication performed by a network entity. The method may include transmitting a soft uplink grant that includes scheduling parameters and first transmission parameters, where the soft uplink grant lacks second transmission parameters or the first transmission parameters have a capability to be modified by a UE into the second transmission parameters. The method may include receiving a parameter message that indicates the second transmission parameters. The method may include receiving a communication scheduled by the soft uplink grant. The method may include decoding the communication based at least in part on the second transmission parameters.

Some aspects described herein relate to a UE for wireless communication. The UE may include a memory and one or more processors coupled to the memory. The one or more processors may be configured to receive an uplink grant that schedules a communication in a scheduled resource and that includes first transmission parameters associated with the scheduled resource. The one or more processors may be configured to select, in response to the uplink grant being a soft uplink grant, second transmission parameters that include new transmission parameters not included in the first transmission parameters or include modified first transmission parameters. The one or more processors may be configured to transmit the communication in the scheduled resource or a subset of the scheduled resource using at least the second transmission parameters.

Some aspects described herein relate to a network entity for wireless communication. The network entity may include a memory and one or more processors coupled to the memory. The one or more processors may be configured to transmit a soft uplink grant that includes scheduling parameters and first transmission parameters, where the soft uplink grant lacks second transmission parameters or the first transmission parameters have a capability to be modified by a UE into the second transmission parameters. The one or more processors may be configured to receive a parameter message that indicates the second transmission parameters. The one or more processors may be configured to receive a communication scheduled by the soft uplink grant. The one or more processors may be configured to decode the communication based at least in part on the second transmission parameters.

Some aspects described herein relate to a non-transitory computer-readable medium that stores a set of instructions for wireless communication by a UE. The set of instructions, when executed by one or more processors of the UE, may cause the UE to receive an uplink grant that schedules a communication in a scheduled resource and that includes first transmission parameters associated with the scheduled resource. The set of instructions, when executed by one or more processors of the UE, may cause the UE to select, in response to the uplink grant being a soft uplink grant, second transmission parameters that include new transmission parameters not included in the first transmission parameters or include modified first transmission parameters. The set of instructions, when executed by one or more processors of the UE, may cause the UE to transmit the communication in the scheduled resource or a subset of the scheduled resource using at least the second transmission parameters.

Some aspects described herein relate to a non-transitory computer-readable medium that stores a set of instructions for wireless communication by a network entity. The set of instructions, when executed by one or more processors of the network entity, may cause the network entity to transmit a soft uplink grant that includes scheduling parameters and first transmission parameters, where the soft uplink grant lacks second transmission parameters or the first transmission parameters have a capability to be modified by a UE into the second transmission parameters. The set of instructions, when executed by one or more processors of the network entity, may cause the network entity to receive a parameter message that indicates the second transmission parameters. The set of instructions, when executed by one or more processors of the network entity, may cause the network entity to receive a communication scheduled by the soft uplink grant. The set of instructions, when executed by one or more processors of the network entity, may cause the network entity to decode the communication based at least in part on the second transmission parameters.

Some aspects described herein relate to an apparatus for wireless communication. The apparatus may include means for receiving an uplink grant that schedules a communication in a scheduled resource and that includes first transmission parameters associated with the scheduled resource. The apparatus may include means for selecting, in response to the uplink grant being a soft uplink grant, second transmission parameters that include new transmission parameters not included in the first transmission parameters or include modified first transmission parameters. The apparatus may include means for transmitting the communication in the scheduled resource or a subset of the scheduled resource using at least the second transmission parameters.

Some aspects described herein relate to an apparatus for wireless communication. The apparatus may include means for transmitting a soft uplink grant that includes scheduling parameters and first transmission parameters, where the soft uplink grant lacks second transmission parameters or the first transmission parameters have a capability to be modified by a UE into the second transmission parameters. The apparatus may include means for receiving a parameter message that indicates the second transmission parameters. The apparatus may include means for receiving a communication scheduled by the soft uplink grant. The apparatus may include means for decoding the communication based at least in part on the second transmission parameters.

Aspects generally include a method, apparatus, system, computer program product, non-transitory computer-readable medium, UE, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
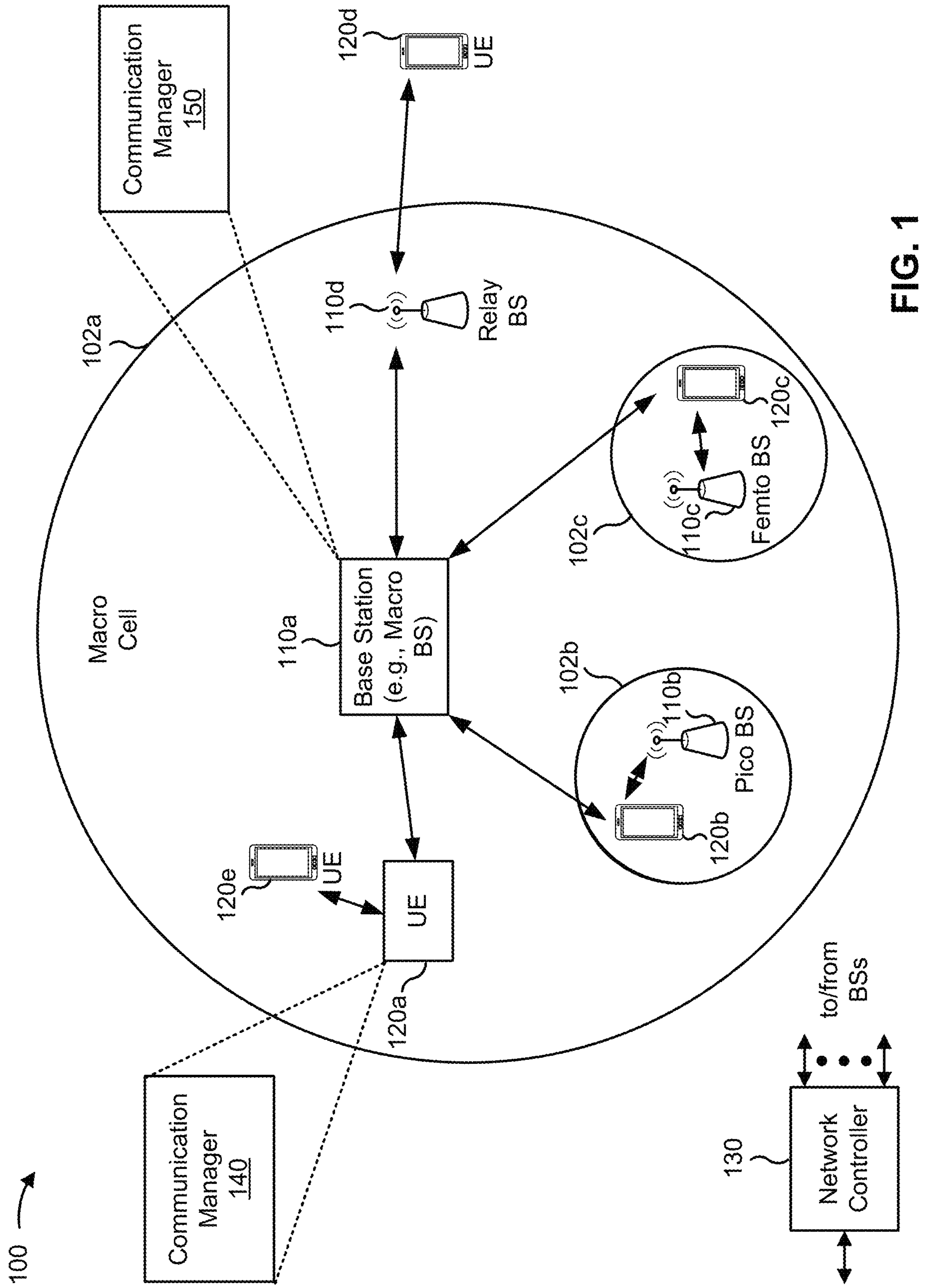
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120*a*, a UE 120*b*, a UE 120*c*, a UE 120*d*, and a UE 120*e*). The wireless network 100 may also include one or more network entities, such as base stations 110 (shown as a BS 110*a*, a BS 110*b*, a BS 110*c*, and a BS 110*d*), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an uplink grant that schedules a communication in a scheduled resource and that includes first transmission parameters associated with the scheduled resource. The communication manager 140 may select, in response to the uplink grant being a soft uplink grant, second transmission parameters that include new transmission parameters not included in the first transmission parameters or include modified first transmission parameters. The communication manager 140 may transmit the communication in the scheduled resource or a subset of the scheduled resource using at least the second transmission parameters. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit a soft uplink grant that includes scheduling parameters and first transmission parameters, where the soft uplink grant lacks second transmission parameters or the first transmission parameters have a capability to be modified by a UE into the second transmission parameters. The communication manager 150 may receive a parameter message that indicates the second transmission parameters, receive a communication scheduled by the soft uplink grant, and decode the communication based at least in part on the second transmission parameters. Additionally, or alternatively, the communication manager 150 may perform one or more other operations described herein.

As indicated above, FIG. 1 is provided as an example. Other examples may differ from what is described with regard to FIG. 1.

Figure 2:
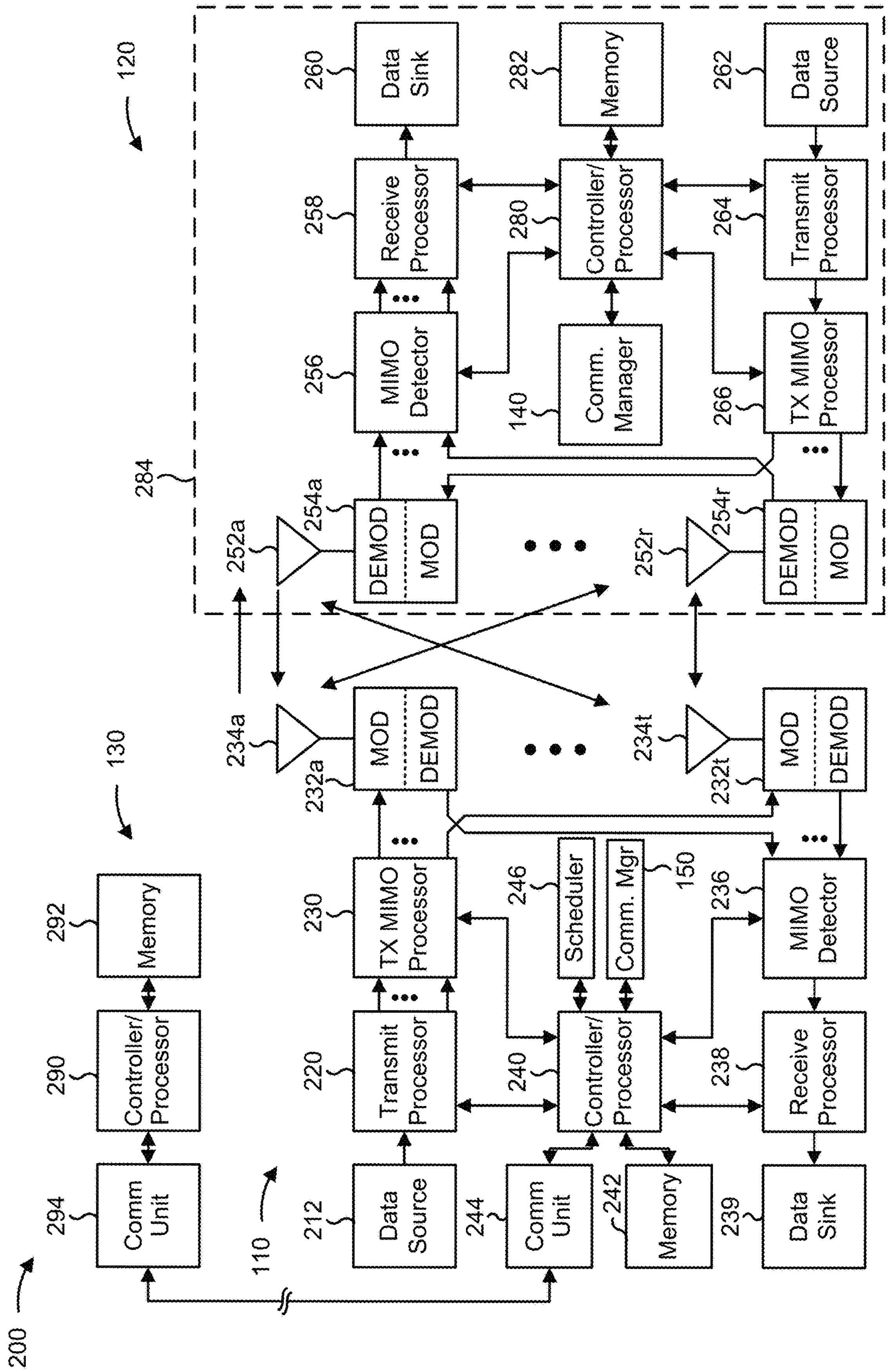
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna (s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

A controller/processor of a network entity, (e.g., the controller/processor 240 of the base station 110), the controller/processor 280 of the UE 120, and/or any other component(s) of FIG. 2 may perform one or more techniques associated with using soft uplink grants, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., a UE 120) includes means for receiving an uplink grant that schedules a communication in a scheduled resource and that includes first transmission parameters associated with the scheduled resource; means for selecting, in response to the uplink grant being a soft uplink grant, second transmission parameters that include new transmission parameters not included in the first transmission parameters or include modified first transmission parameters; and/or means for transmitting the communication in the scheduled resource or a subset of the scheduled resource using at least the second transmission parameters. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for transmitting a soft uplink grant that includes scheduling parameters and first transmission parameters, where the soft uplink grant lacks second transmission parameters or the first transmission parameters have a capability to be modified by a UE into the second transmission parameters; means for receiving a parameter message that indicates the second transmission parameters; means for receiving a communication scheduled by the soft uplink grant; and/or means for decoding the communication based at least in part on the second transmission parameters. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
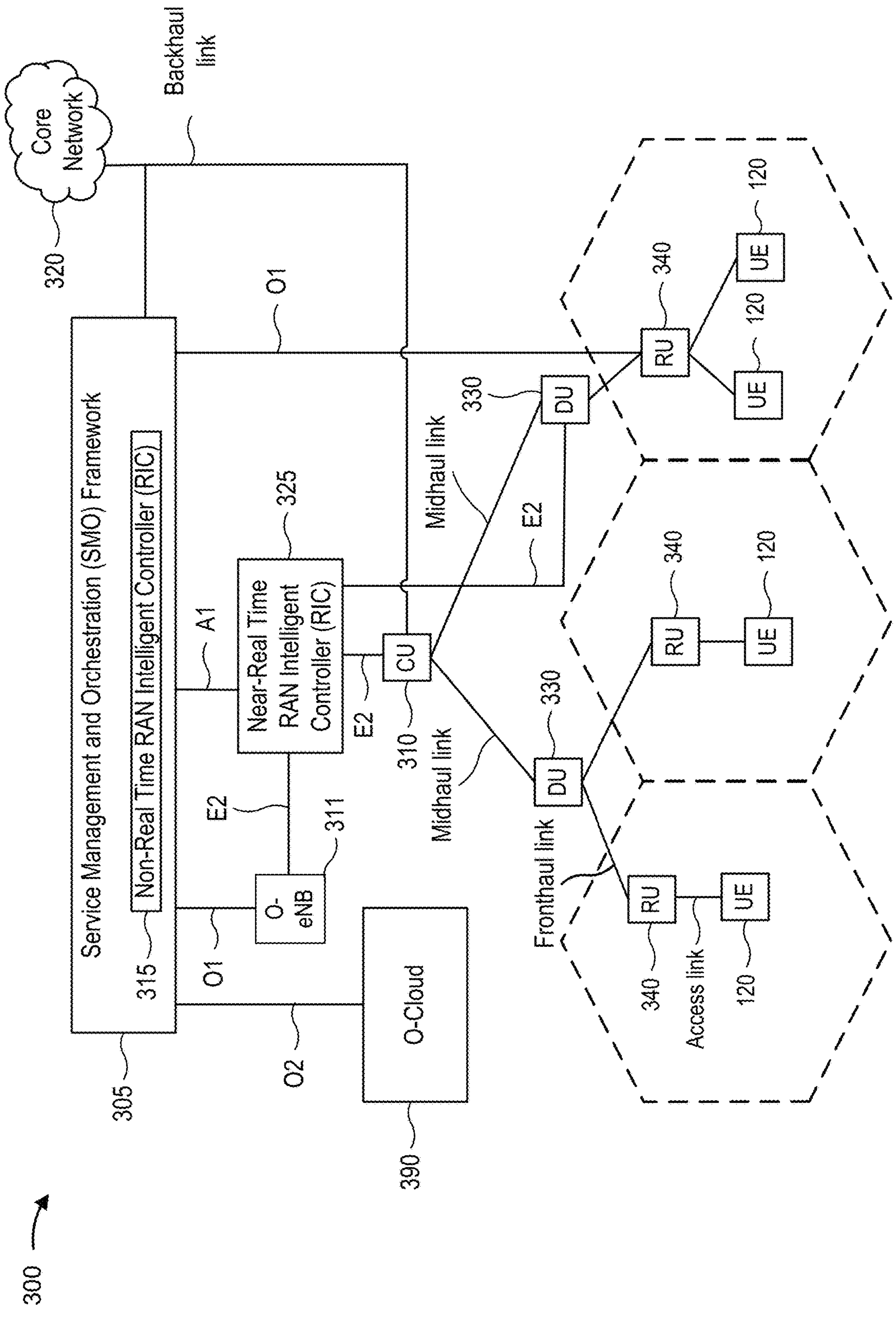
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs") and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
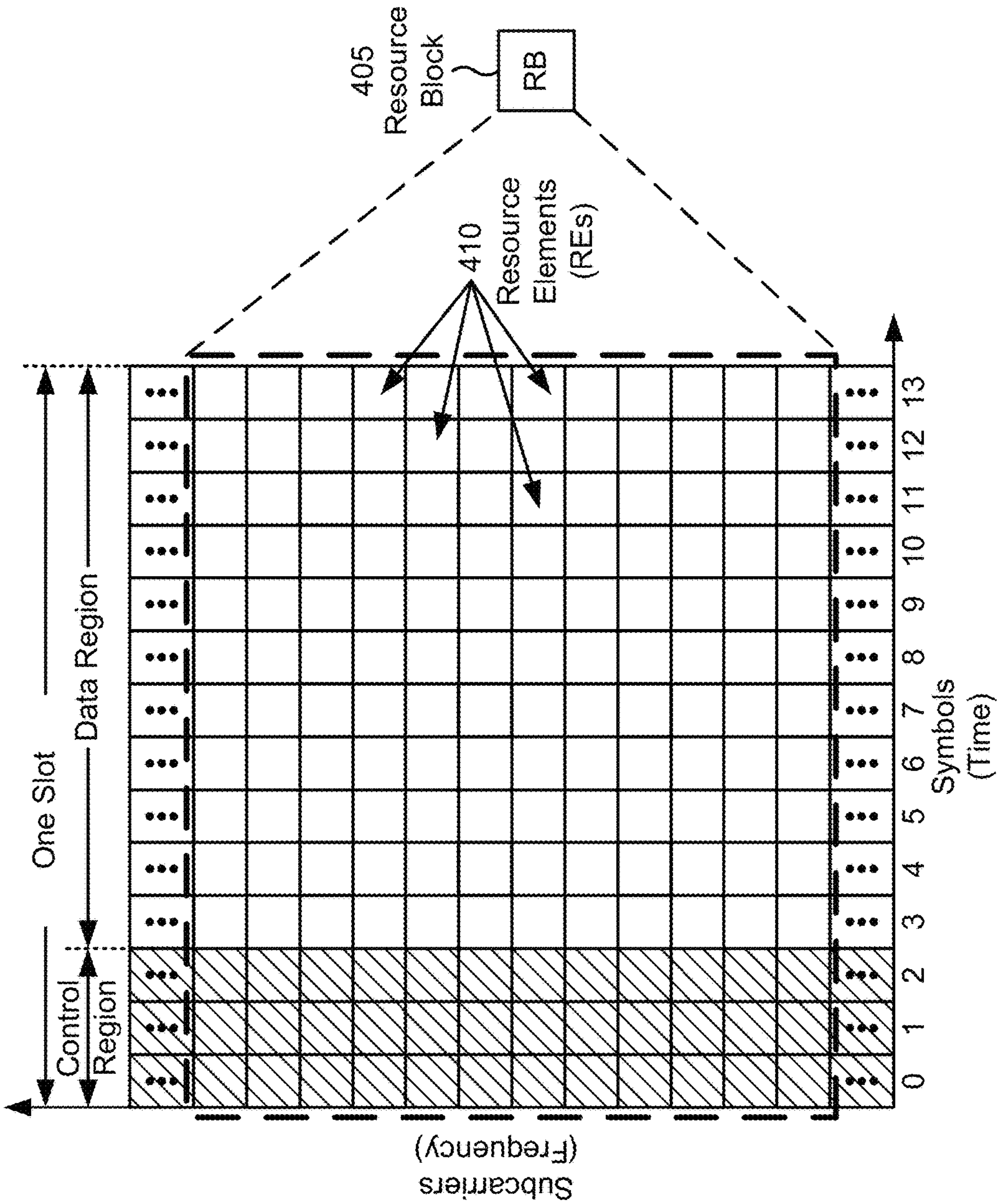
FIG. 4 is a diagram illustrating an example of a slot format, in accordance with the present disclosure.

FIG. 4 is a diagram illustrating an example 400 of a slot format, in accordance with the present disclosure. As shown in FIG. 4, time-frequency resources in a radio access network may be partitioned into resource blocks, shown by a single resource block (RB) 405. An RB 405 is sometimes referred to as a physical resource block (PRB). An RB 405 includes a set of subcarriers (e.g., 12 subcarriers) and a set of symbols (e.g., 14 symbols) that are schedulable by a network entity (e.g., base station 110) as a unit. In some aspects, an RB 405 may include a set of subcarriers in a single slot. As shown, a single time-frequency resource included in an RB 405 may be referred to as a resource element (RE) 410. An RE 410 may include a single subcarrier (e.g., in frequency) and a single symbol (e.g., in time). A symbol may be referred to as an orthogonal frequency division multiplexing (OFDM) symbol. An RE 410 may be used to transmit one modulated symbol, which may be a real value or a complex value.

In some telecommunication systems (e.g., NR), RBs 405 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured.

As indicated above, FIG. 4 is provided as an example. Other examples may differ from what is described with respect to FIG. 4.

Figure 5:
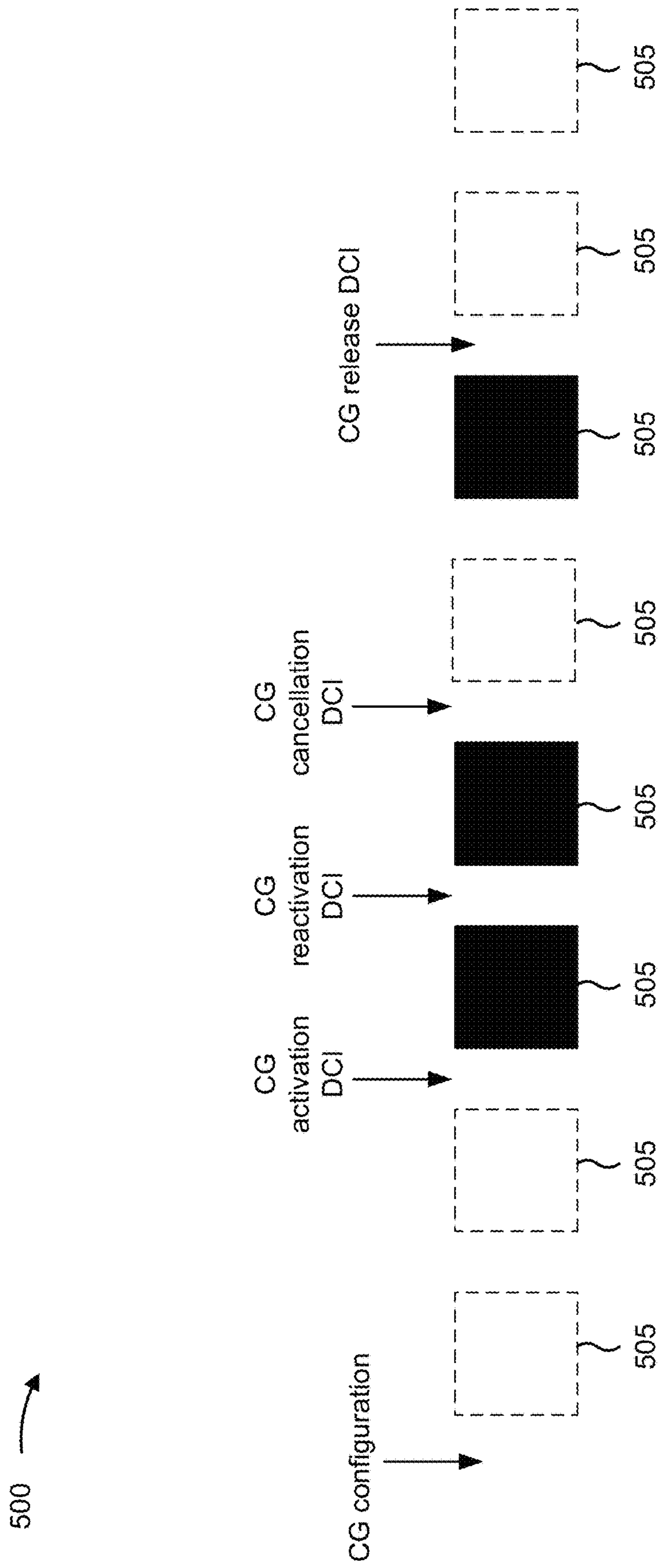
FIG. 5 is a diagram illustrating an example of uplink configured grant communication, in accordance with the present disclosure.

FIG. 5 is a diagram illustrating an example 500 of uplink configured grant (CG) communication, in accordance with the present disclosure.

PRBs for uplink communications may be granted according to a configuration. For example, CG communications may include periodic uplink communications that are configured for a UE, such that the network entity does not need to send separate downlink control information (DCI) to schedule each uplink communication, thereby conserving signaling overhead.

As shown in example 500, a UE (e.g., a UE 120) may be configured with a CG configuration for CG communications. For example, the UE may receive the CG configuration via an RRC message transmitted by a network entity (e.g., a base station 110). The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 505 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

There are two types of CG for physical uplink shared channel (PUSCH) communications. For Type 1 CG PUSCH, RRC signaling configures the time and frequency domain resource allocation, including a periodicity, an offset, a start symbol, a length of the PUSCH communication, the MCS, the number of repetitions, a redundancy version (RV), and a transmit power level, among other parameters.

For Type 2 CG PUSCH, only periodicity and the number of repetitions are configured by RRC signaling. Other parameters, such as the MCS, an RB allocation, and/or antenna ports, for the CG PUSCH communications are configured through an activation DCI. The UE may begin transmitting in the CG occasions 505 based at least in part on receiving the CG activation DCI. For example, beginning with a next scheduled CG occasion 505 subsequent to receiving the CG activation DCI, the UE may transmit a PUSCH communication in the scheduled CG occasions 505 using the communication parameters indicated in the CG activation DCI. The UE may refrain from transmitting in configured CG occasions 505 prior to receiving the CG activation DCI.

The network entity may transmit CG reactivation DCI to the UE to change the communication parameters for the CG PUSCH communications. Based at least in part on receiving the CG reactivation DCI, and the UE may begin transmitting in the scheduled CG occasions 505 using the communication parameters indicated in the CG reactivation DCI. For example, beginning with a next scheduled CG occasion 505 subsequent to receiving the CG reactivation DCI, the UE may transmit PUSCH communications in the scheduled CG occasions 505 based at least in part on the communication parameters indicated in the CG reactivation DCI.

In some cases, such as when the network entity needs to override a scheduled CG communication for a higher priority communication, the network entity may transmit CG cancellation DCI to the UE to temporarily cancel or deactivate one or more subsequent CG occasions 505 for the UE. The CG cancellation DCI may deactivate only a subsequent one CG occasion 505 or a subsequent N CG occasions 505 (where N is an integer). CG occasions 505 after the one or more (e.g., N) CG occasions 505 subsequent to the CG cancellation DCI may remain activated. Based at least in part on receiving the CG cancellation DCI, the UE may refrain from transmitting in the one or more (e.g., N) CG occasions 505 subsequent to receiving the CG cancellation DCI. As shown in example 500, the CG cancellation DCI cancels one subsequent CG occasion 505 for the UE. After the CG occasion 505 (or N CG occasions) subsequent to receiving the CG cancellation DCI, the UE may automatically resume transmission in the scheduled CG occasions 505.

The network entity may transmit CG release DCI to the UE to deactivate the CG configuration for the UE. The UE may stop transmitting in the scheduled CG occasions 505 based at least in part on receiving the CG release DCI. For example, the UE may refrain from transmitting in any scheduled CG occasions 505 until another CG activation DCI is received from the base station. Whereas the CG cancellation DCI may deactivate only a subsequent one CG occasion 505 or a subsequent N CG occasions 505, the CG release DCI deactivates all subsequent CG occasions 505 for a given CG configuration for the UE until the given CG configuration is activated again by a new CG activation DCI.

As indicated above, FIG. 5 is provided as an example. Other examples may differ from what is described with respect to FIG. 5.

Figure 6:
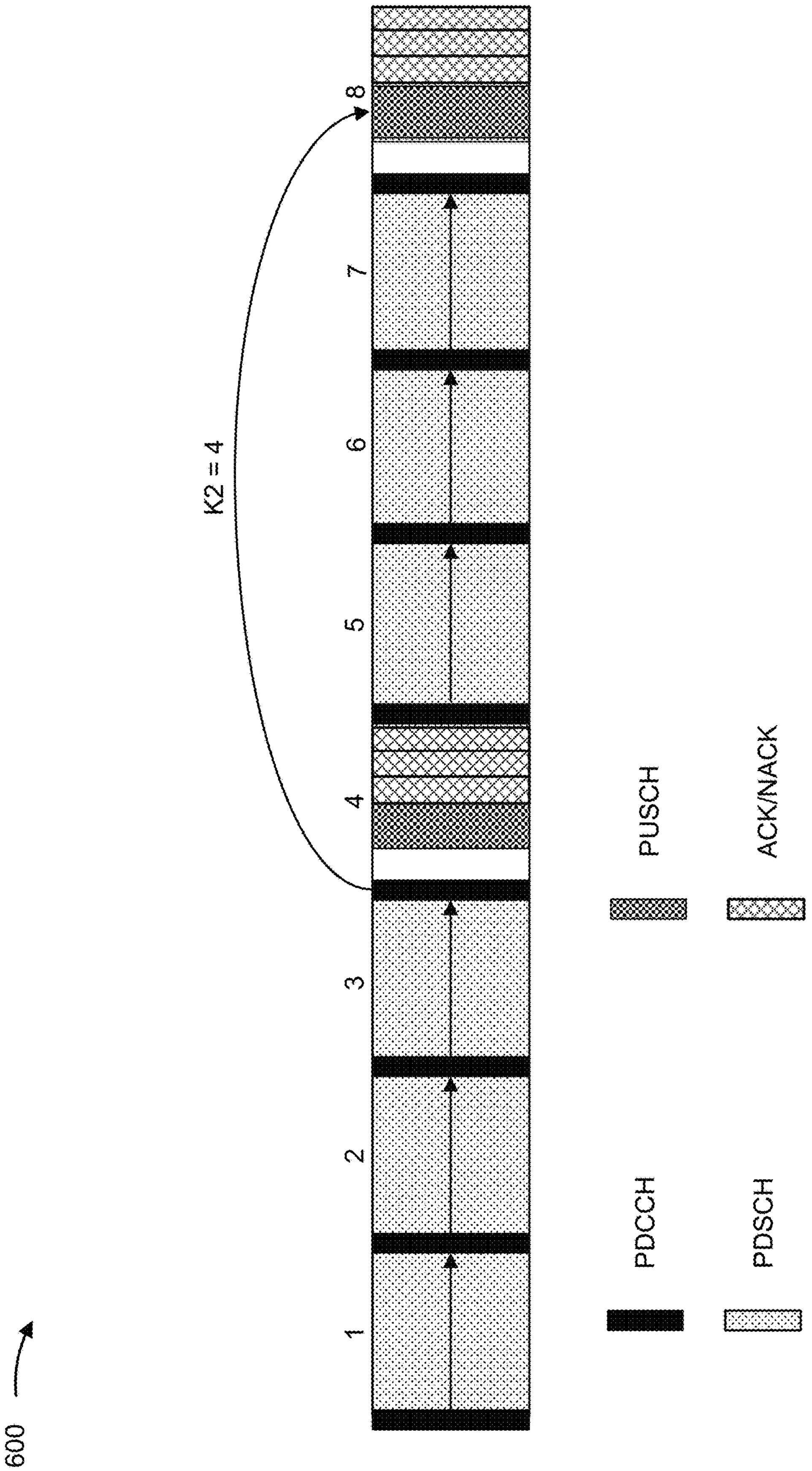
FIG. 6 is a diagram illustrating an example of uplink grants, in accordance with the present disclosure.

FIG. 6 is a diagram illustrating an example 600 of uplink grants, in accordance with the present disclosure.

While FIG. 5 shows CG for uplink communications, FIG. 6 shows that a network entity (e.g., base station 110) may dynamically grant PRBs for uplink communications. A dynamic grant (DG) may be in response to a scheduling request (SR) or a buffer status report (BSR) from a UE. The UE may transmit an SR on a physical uplink control channel (PUCCH), requesting radio resources in the uplink when the UE has pending data in its buffer. The network entity may then transmit a physical downlink control channel (PDCCH) communication, such as an uplink grant DCI. The DCI specifies a scheduled resource (time-frequency resources) and transmission parameters for the UE to use to transmit a communication on the PUSCH.

Example 600 shows, in slot 4, a PDCCH communication (e.g., DCI) that schedules a PUSCH communication in slot 9 (offset K2 is 4 slots in example 600). Different DCI formats may be used for PUSCH scheduling (e.g., DCI format 0_0, DCI format 0_1, and DCI format 0_2). For example, the content of a DCI with DCI format 1_0 may include a time domain resource allocation (TDRA) that indicates time resources and a frequency domain resource allocation (FDRA) (with a frequency hopping flag) that indicates frequency resources for the scheduled PUSCH communication. The DCI may also include a carrier indicator, an uplink carrier indicator, a supplementary uplink (SUL) carrier indicator, a bandwidth part (BWP) indicator, an MCS, a new data indicator (NDI), an RV, a hybrid automatic request (HARQ) process number, a first downlink assignment index (DAI), a second DAI, a transmit power control (TPC), a sounding service request indicator (SRI), precoding information, a quantity of layers, antenna ports, a sounding reference signal (SRS) request, a channel state information (CSI) request, a phase tracking reference signal (PTRS) demodulation reference signal (DMRA) beta parameter, a DMRS sequence initialization, or any combination thereof. Example 600 also shows that the UE may provide feedback, such as an acknowledgement (ACK) or a negative acknowledgment (NACK), for the DCI or for a physical downlink shared channel (PDSCH) communication.

While a network entity (e.g., base station 110) may indicate resources for a PUSCH communication in an uplink grant, the UE may be in a more favorable position to determine some or all of the uplink transmission parameters. For example, the network entity's determination of the MCS and the quantity of layers are based on past CSI feedback from the UE or from SRS measurements. However, the CSI may be outdated at the network entity. If the UE receives a CSI reference signal (CSI-RS) from the network entity and reports back CSI feedback every 10 milliseconds (ms), the network entity may determine the MCS based on outdated feedback, even if the UE has a new CSI-RS measurement that is waiting to be reported. The UE may also obtain more accurate interference measurements that may be due to sporadic interference. In addition, the network entity may schedule a new packet transmission while the UE is attempting to retransmit an urgent packet that previously failed (e.g., for Type-3 HARQ codebook via downlink feedback information (DFI) indicating failed uplink reception due to a channel access procedure).

In other words, UE-side CSI may be better than network-side CSI and thus transmission parameters from the network entity may cause the UE to consume more power and experience more interference. If UE-side CSI is worse than network-side CSI, impulsive interference may be measured at the UE, and a PUSCH communication may not be decoded successfully at the network entity, leading to a higher error rate and retransmissions.

As indicated above, FIG. 6 is provided as an example. Other examples may differ from what is described with respect to FIG. 6.

Figure 7:
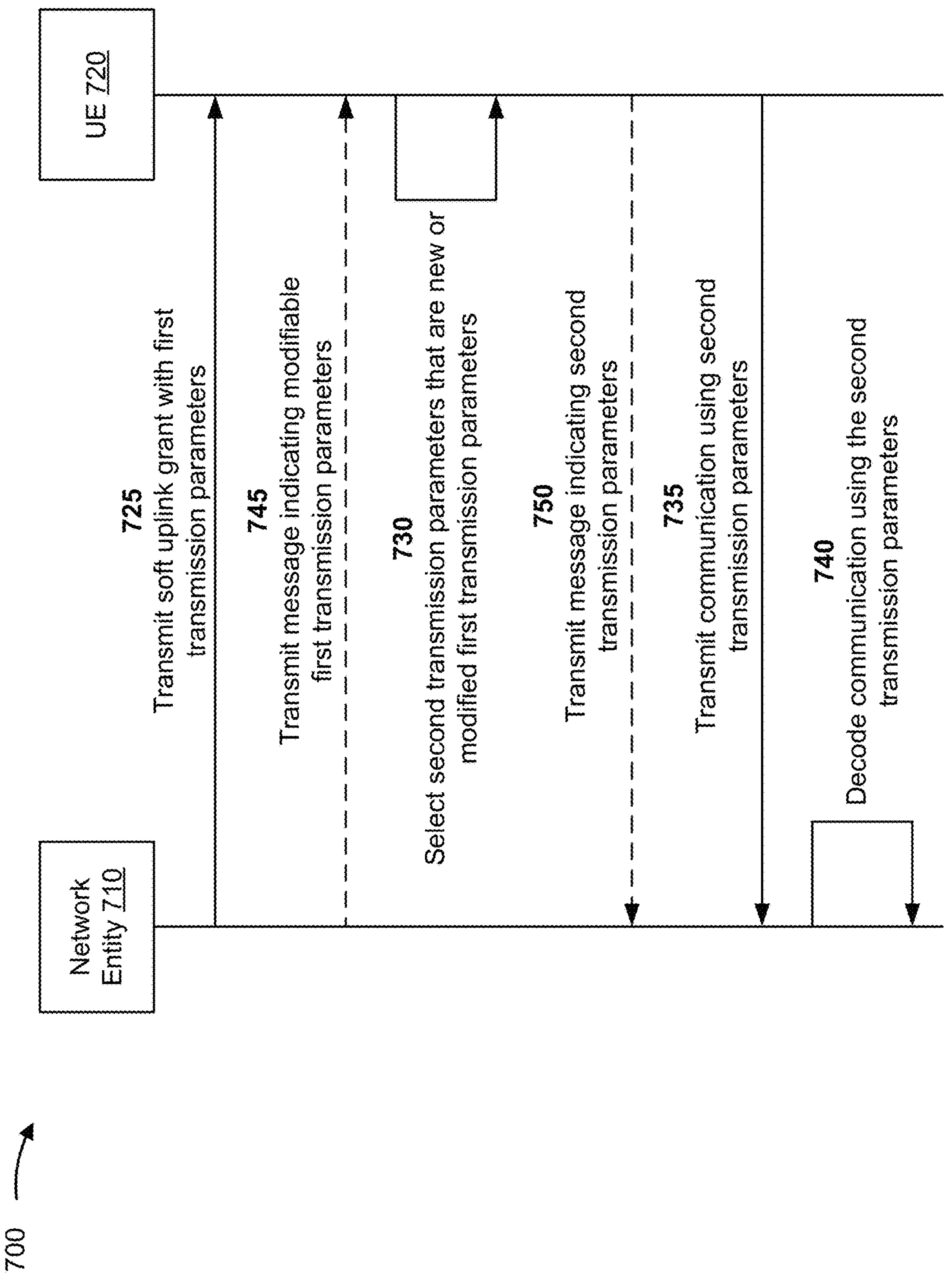
FIG. 7 is a diagram illustrating an example of using soft uplink grants, in accordance with the present disclosure.

FIG. 7 is a diagram illustrating an example 700 of using soft uplink grants, in accordance with the present disclosure. As shown in FIG. 7, a network entity 710 (e.g., a base station 110) and a UE 720 (e.g., a UE 120) may communicate with one another.

According to various aspects described herein, the network entity 710 may transmit a soft uplink grant to the UE 720, as shown by reference number 725. The soft uplink grant may include a scheduled resource and transmission parameters associated with the scheduled resource. The grant may be considered "soft" because the UE 720 may be free to modify the grant based at least in part on conditions or restraints at the UE 720. For example, as shown by reference number 730, the UE 720 may select second transmission parameters that include new transmission parameters (not indicated in the grant) or that include modified first transmission parameters (different values than indicated in the grant). As shown by reference number 735, the UE 720 may transmit a communication (e.g., a PUSCH communication) that uses the scheduled resource and the second transmission parameters.

In some aspects, the UE 720 may use a subset of the scheduled resource to transmit the communication. The UE 720 may select the subset of the scheduled resource and/or the second transmission parameters based at least in part on UE-side CSI and/or traffic arrival characteristics.

As shown by reference number 740, the network entity 710 may decode the communication using the second transmission parameters. The network entity 710 may adapt its transmission and/or reception according to the second transmission parameters, including adjusting, for example, the MCS, quantity of layers, the RV, the NDI, and/or the HARQ process number.

The UE 720 may modify or add various transmission parameters. For example, the UE 720 may modify the HARQ process number and the NDI if the network entity 710 provides scheduling for a new transport block (TB), while the UE 720 determines to transmit a previously failed TB. The UE 720 may modify the quantity of (additional) DMRS and/or the position of the (additional) DMRS (e.g., if the UE 720 determines that the CSI is better than what is predicted by the network entity 710.) The UE 720 may modify the density and/or position of a PTRS. The UE 720 may include, in the scheduled resource, an SRS or another reference signal (e.g., for peak-to-average power ratio (PAPR) reduction, emission reduction, tone reservation, or active interference cancellation).

By having more flexibility in selecting transmission parameters associated with a grant, whether a DG grant or a CG grant, the network entity 710 and the UE 720 may improve communications and not waste power and signaling resources.

In some aspects, the scheduling by the network entity 710 may remain unchanged, but the UE 720 may ignore one or more transmission parameters in the grant or determine to use one or more transmission parameters that differ from the transmission parameters indicated in the grant.

In some aspects, the network entity 710 may transmit a message to the UE 720 that indicates that transmission parameters may be modified. The message may indicate which transmission parameters may be modified or may indicate that a subset of the scheduled resource may be used. The message may be the grant (e.g., with a DCI format associated with or specific to soft uplink grants) or may be separate from the grant (e.g., RRC message configured for, associated with, or specific to soft uplink grants), as shown by reference number 745. In some aspects, as shown by reference number 750, the UE 720 may transmit a message to the network entity 710 that indicates one or more second transmission parameters, including new transmission parameters and/or values of second transmission parameters that are different than values of the first transmission parameters in the grant. If the UE 720 selects a subset of the scheduled resource of the grant for the communication, the message may indicate the subset of the scheduled resource. The message that the UE 720 transmits to the network entity 710 may be or may be included in uplink control information (UCI).

In some aspects, the grant may be in a new DCI format that does not specify one or more of the transmission parameters. The network entity 710 may determine, based at least in part on a request by the UE 720 and a capability of the UE 720 to determine the parameters by itself. The network entity 710 may configured the UE 720 to select transmission parameters not specified in the grant. Such transmission parameters may be the MCS, the RV, a transmitted precoding matrix indicator (TPMI), and/or the DMRS configuration, among other parameters. The network entity 710 may transmit a message (or the grant may have a format) that limits the transmission parameters and/or limits the range of values from which the UE 720 may select. For example, the network entity 710 may indicate a minimum MCS and/or a maximum MCS that the UE 720 may select. By limiting the modification of the transmission parameters at the UE 720, the network entity 710 may exercise some control over the selection by the UE 720 without being too restrictive of the freedom of the UE 720 to select appropriate transmission parameters.

In some aspects, the network entity 710 may switch on and off the capability of the UE 720 to be free to select transmission parameters. The network entity 710 may transmit activation or deactivation messages in DCI, a medium access control control element (MAC CE), or an RRC message in a dynamic, a semi-persistent, or a semi-static manner. The message may be a one-shot message for current scheduling. The message may activate or deactivate the capability for a time duration.

In some aspects, the network entity 710 may specify a DCI format for which the UE 720 may modify the transmission parameters. For example, the UE 720 may not modify transmission parameters if the DCI format is DCI format 0_0, and the UE 720 may modify transmission parameters if the DCI format is for CG Type 1 only.

As indicated above, FIG. 7 is provided as an example. Other examples may differ from what is described with respect to FIG. 7.

Figure 8:
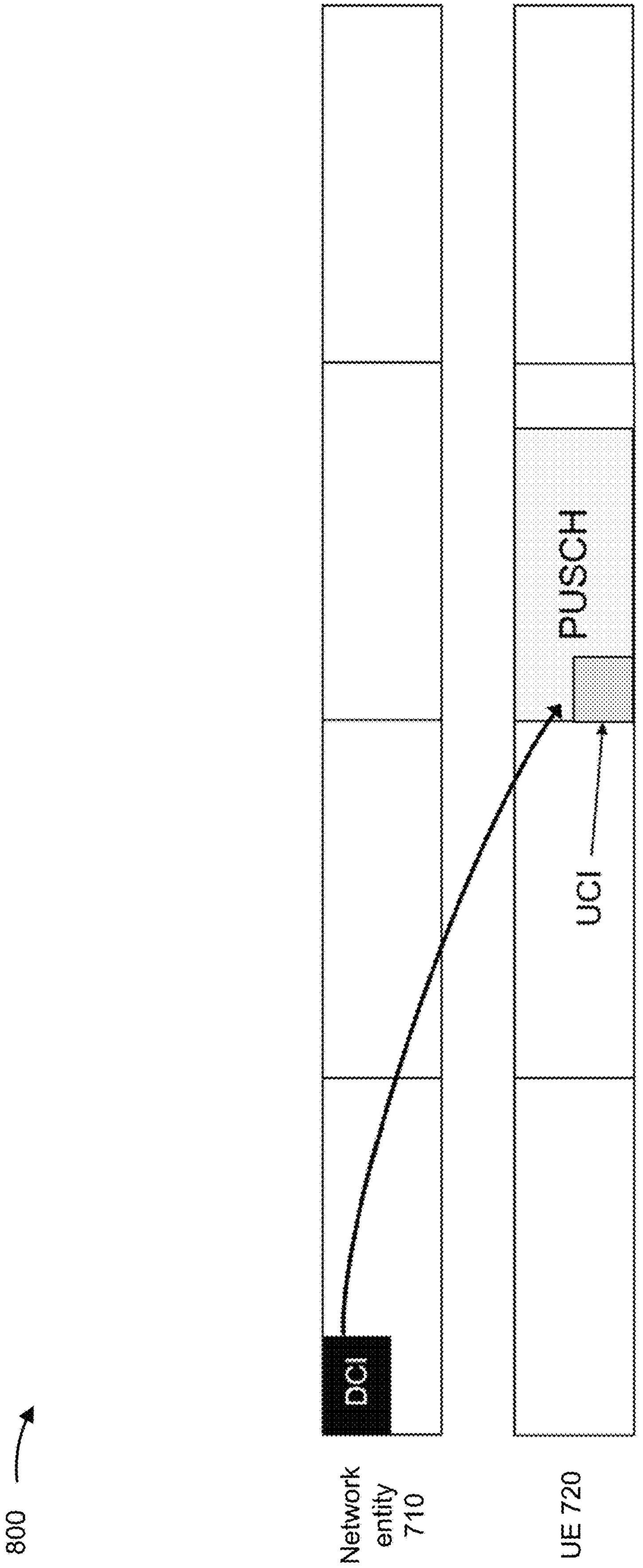
FIG. 8 is a diagram illustrating an example of a soft uplink grant indication, in accordance with the present disclosure.

FIG. 8 is a diagram illustrating an example 800 of a soft uplink grant indication, in accordance with the present disclosure.

Example 800 shows that the UE 720 may include the message indicating second transmission parameters in UCI that is transmitted with or multiplexed with a PUSCH communication scheduled by DCI. In some aspects, the UCI may be included in preconfigured resources known to both the network entity 710 and the UE 720 (e.g., first 10 RBs in the first 3 symbols). The MCS (e.g., quadrature phase-shift keying (QPSK)+polar coding) may be preconfigured and/or configurable by the network entity 710 (e.g., via an RRC message). The payload size may be fixed or configurable in a semi-static manner by the network entity 710.

In some aspects, the UE 720 may skip transmitting the message in UCI in response to the scheduled resource being smaller than resources for the UCI or smaller than a threshold amount of the resources for the UCI. The threshold amount may be, for example, 300% of resources required by the UCI. The threshold may be satisfied if a quantity of PUSCH symbols is greater than a quantity of UCI symbols and/or if a quantity of PUSCH RBs is greater than, for example, 120% of UCI RBs. In this scenario, the UE 720 may not be allowed to modify any transmission parameters specified in the grant. For parameters not specified in the grant, the UE 720 may use some nominal parameters (e.g., a preconfigured MCS). The nominal parameters for this scenario may be configured by the network entity 710 with RRC or MAC signaling.

The UE 720 may transmit the message in the UCI in response to the scheduled resource being larger than the resources for the UCI or larger than the threshold amount of the resources for the UCI.

In some aspects, UCI may be used with nominal resource configurations. UCI resources may be taken from resources for the PUSCH communication following a beta offset value for a payload size and/or using an alpha scaling factor for a coding rate from the network entity 710. That is, the UCI may be configured based at least in part on the beta offset value or the alpha scaling factor. The UE 720 may select the alpha offset value based at least in part on a reliability requirement and/or select the beta scaling factor based at least in part on signaling overhead. The UCI may use, for example, 20% of the PUSCH resources (e.g., first 20% of RBs with an earliest symbol index, or an alpha scaling factor of 0.2). In some aspects, UCI resources may be determined based at least in part on a payload size and/or the MCS for the message in UCI (e.g., payload size×beta offset value 1/(MCS order×coding rate×quantity of layers). UCI resources may be determined based at least in part on a payload size and/or the MCS for the message in PUSCH communication (e.g., total RE data payload×beta offset value 2/(MCS order×coding rate×quantity of layers). In some aspects, the UCI resources may be determined by the minimum of any of the parameters described above.

In some aspects, the network entity 710 may configure parameters for controlling the UCI resources in an RRC message or in the grant. The network entity 710 or the UE 720 may select the alpha scaling factor based at least in part on the other overhead in the PUSCH communication (e.g., for a DMRS, a PTRS, or a SRS). The beta offset value 1 (betaOffset1) may be selected based at least in part on the reliability requirement of the message in the UCI. The beta offset value 2 (betaOffset2) may be selected based at least in part on the reliability requirement of the PUSCH communication.

As indicated above, FIG. 8 is provided as an example. Other examples may differ from what is described with regard to FIG. 8.

Figure 9:
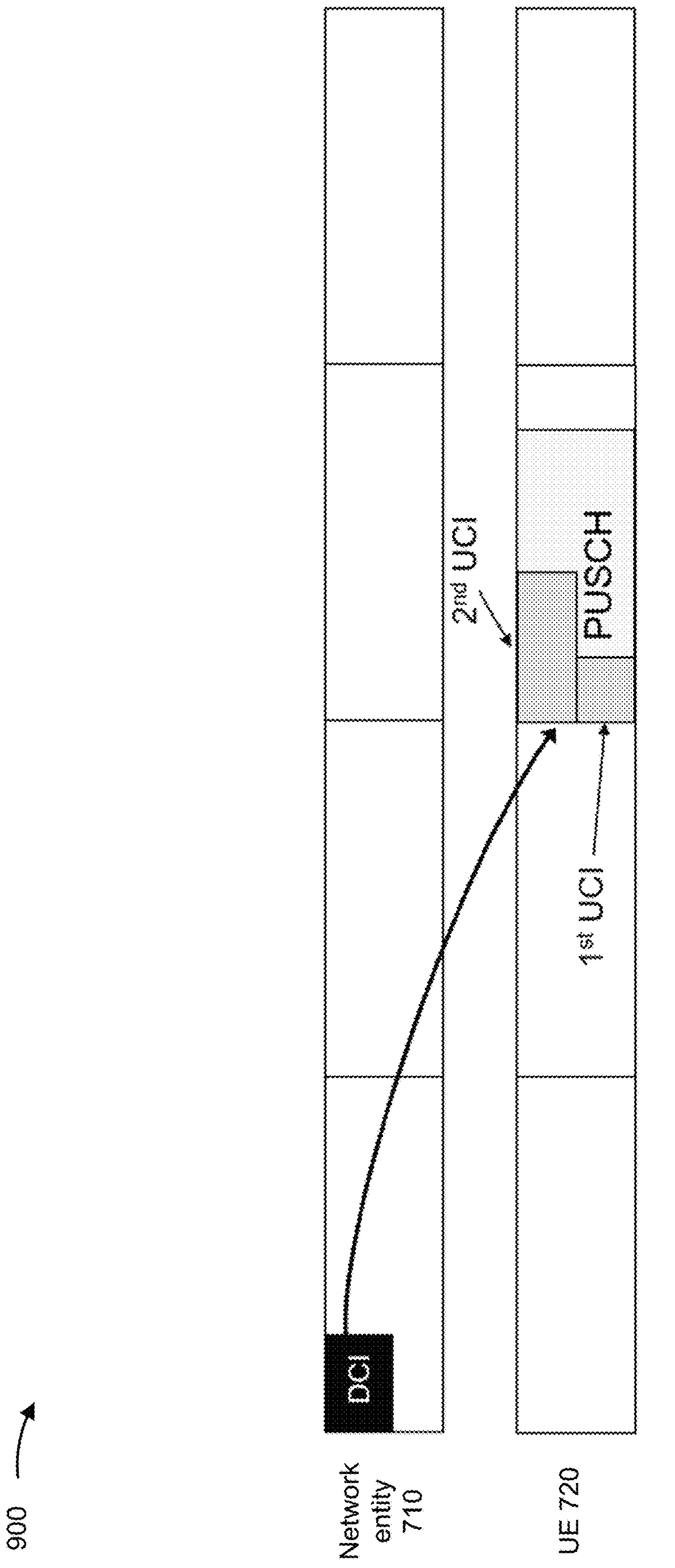
FIG. 9 is a diagram illustrating an example of a soft uplink grant indication, in accordance with the present disclosure.

FIG. 9 is a diagram illustrating an example 900 of using a soft uplink grant indication, in accordance with the present disclosure.

In some aspects, the UE 720 may use two-stage UCI, as shown by example 900. The first stage of the UCI may be preconfigured and may indicate less-specific information (e.g., indicating DMRS modification, PTRS modification, or SRS modification). The second stage of the UCI may have more resources to provide more specific information. That is, the first stage may be a "rough" indication of UCI, and the second stage may be a more detailed indication of UCI (e.g., new MCS, a tone reservation, an active interference cancellation (AIC), a HARQ process number, an RV). The first stage may indicate a format for the second stage. A different format for the second stage may have a different payload or a different degree of freedom configured by the network entity 710. The second stage may include information other than modified grant information, such as a Type 1 HARQ CB, a Type 2 HARQ CB, CSI feedback, an SR, a BSR, or a combination thereof. The first stage may indicate resources used by the second stage to decode the UCI. The second stage may reuse DMRS for the PUSCH. The first state may indicate resources used for the second stage by indicating the alpha scaling factor or the beta offset value selected by the UE 720.

In some aspects, the first stage UCI may indicate the modification of a DMRS, an MCS, a HARQ process number, and/or an additional RS (e.g., PTRS, SRS) The second stage UCI may indicate the position and number of DMRS, a tone reservation, and/or AIC signals.

As indicated above, FIG. 9 is provided as an example. Other examples may differ from what is described with regard to FIG. 9.

Figure 10:
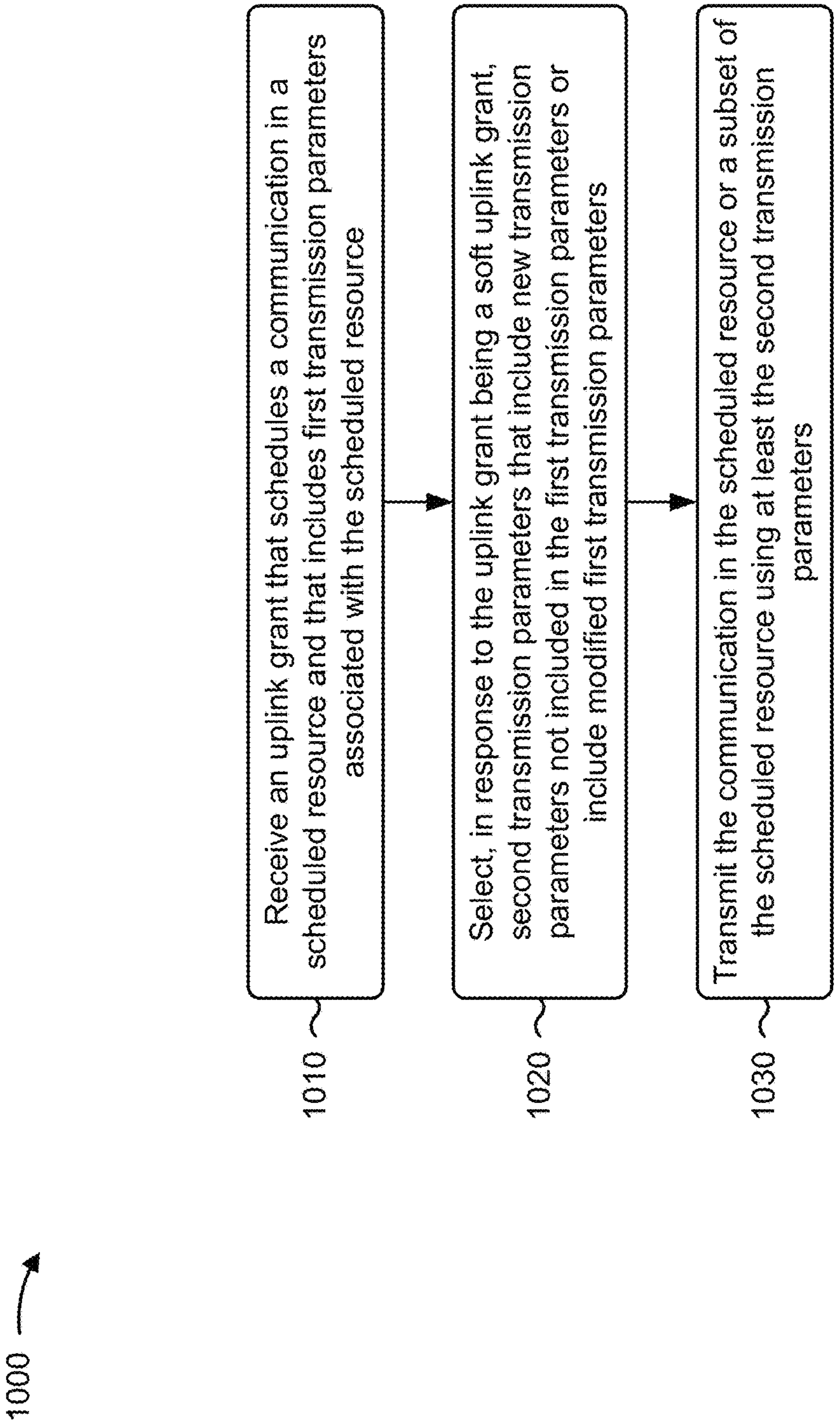
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., a UE 120, UE 720) performs operations associated with using a soft uplink grant.

As shown in FIG. 10, in some aspects, process 1000 may include receiving an uplink grant that schedules a communication in a scheduled resource and that includes first transmission parameters associated with the scheduled resource (block 1010). For example, the UE (e.g., using communication manager 1208 and/or reception component 1202 depicted in FIG. 12) may receive an uplink grant that schedules a communication in a scheduled resource and that includes first transmission parameters associated with the scheduled resource, as described above.

As further shown in FIG. 10, in some aspects, process 1000 may include selecting, in response to the uplink grant being a soft uplink grant, second transmission parameters that include new transmission parameters not included in the first transmission parameters or include modified first transmission parameters (block 1020). For example, the UE (e.g., using communication manager 1208 and/or selection component 1210 depicted in FIG. 12) may select, in response to the uplink grant being a soft uplink grant, second transmission parameters that include new transmission parameters not included in the first transmission parameters or include modified first transmission parameters, as described above.

As further shown in FIG. 10, in some aspects, process 1000 may include transmitting the communication in the scheduled resource or a subset of the scheduled resource using at least the second transmission parameters (block 1030). For example, the UE (e.g., using communication manager 1208 and/or transmission component 1204 depicted in FIG. 12) may transmit the communication in the scheduled resource or a subset of the scheduled resource using at least the second transmission parameters, as described above.

Process 1000 may include additional aspects, such as any single aspect or any combination of aspects described below and/or in connection with one or more other processes described elsewhere herein.

In a first aspect, process 1000 includes transmitting a message that indicates one or more of the second transmission parameters or the subset of the scheduled resource.

In a second aspect, alone or in combination with the first aspect, transmitting the message includes transmitting the message in UCI in resources that are configured for indicating the second transmission parameters.

In a third aspect, alone or in combination with one or more of the first and second aspects, transmitting the message includes skipping transmitting the message in UCI in response to the scheduled resource being smaller than resources for the UCI or smaller than a threshold amount of the resources for the UCI, or transmitting the message in the UCI in response to the scheduled resource being larger than the resources for the UCI or larger than the threshold amount of the resources for the UCI.

In a fourth aspect, alone or in combination with one or more of the first through third aspects, the UCI is configured based at least in part on one or more of an offset value for a payload size or a scaling factor for a coding rate, and process 1000 includes selecting the offset value based at least in part on a reliability requirement and selecting the scaling factor based at least in part on signaling overhead.

In a fifth aspect, alone or in combination with one or more of the first through fourth aspects, transmitting the message includes transmitting the message in a two-stage UCI, where a first stage of the UCI includes a first set of the second transmission parameters or an indication for a second set of the second transmission parameters in a second stage of the UCI.

In a sixth aspect, alone or in combination with one or more of the first through fifth aspects, the second transmission parameters include an MCS, a quantity of layers, an RV, an NDI, a HARQ process number, a TPMI, or a combination thereof.

In a seventh aspect, alone or in combination with one or more of the first through sixth aspects, the second transmission parameters include a carrier indicator, an uplink or SUL indicator, a BWP indicator, a frequency hopping flag, a first or second DAI, a TPC value, an SRI, or a combination thereof.

In an eighth aspect, alone or in combination with one or more of the first through seventh aspects, the second transmission parameters include an indication of antenna ports, an SRS request, a CSI request, code block group (CBG) transmission information, DMRS information, or a combination thereof.

In a ninth aspect, alone or in combination with one or more of the first through eighth aspects, selecting the second transmission parameters includes modifying the first transmission parameters to obtain the modified first transmission parameters.

In a tenth aspect, alone or in combination with one or more of the first through ninth aspects, modifying the first transmission parameters includes modifying a HARQ process number and an NDI in response to receiving a grant for a new TB, and determining to retransmit a previously failed transport block.

In an eleventh aspect, alone or in combination with one or more of the first through tenth aspects, modifying the first transmission parameters includes modifying a quantity or position of DMRSs in response to a determination (e.g., prediction or estimation) that CSI is more accurate at the UE than at a network entity.

In a twelfth aspect, alone or in combination with one or more of the first through eleventh aspects, selecting the second transmission parameters includes inserting or modifying a density or position of a PTRS.

In a thirteenth aspect, alone or in combination with one or more of the first through twelfth aspects, selecting the second transmission parameters includes selecting an SRS to include in the scheduled resource.

In a fourteenth aspect, alone or in combination with one or more of the first through thirteenth aspects, selecting the second transmission parameters includes selecting a reference signal to include for PAPR reduction or emission reduction.

In a fifteenth aspect, alone or in combination with one or more of the first through fourteenth aspects, selecting the second transmission parameters in response to the uplink grant being a soft uplink grant includes selecting the second transmission parameters in response to the uplink grant being received in DCI that has a format that is associated with soft uplink grants.

In a sixteenth aspect, alone or in combination with one or more of the first through fifteenth aspects, process 1000 includes receiving a message that indicates the format that is associated with soft uplink grants.

In a seventeenth aspect, alone or in combination with one or more of the first through sixteenth aspects, selecting the second transmission parameters in response to the uplink grant being a soft uplink grant includes selecting the second transmission parameters in response to the uplink grant being received in an RRC message that is configured for soft uplink grants.

In an eighteenth aspect, alone or in combination with one or more of the first through seventeenth aspects, process 1000 includes receiving a message that indicates parameters of the first transmission parameters that are modifiable by the UE.

In a nineteenth aspect, alone or in combination with one or more of the first through eighteenth aspects, process 1000 includes receiving a message that indicates a range, a condition, or a threshold for a modifiable parameter of the first transmission parameters.

In a twentieth aspect, alone or in combination with one or more of the first through nineteenth aspects, process 1000 includes receiving a message that indicates a DCI format or an RRC configuration for soft uplink grants.

In a twenty-first aspect, alone or in combination with one or more of the first through twentieth aspects, process 1000 includes receiving a message that activates or deactivates the selecting of the second transmission parameters.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
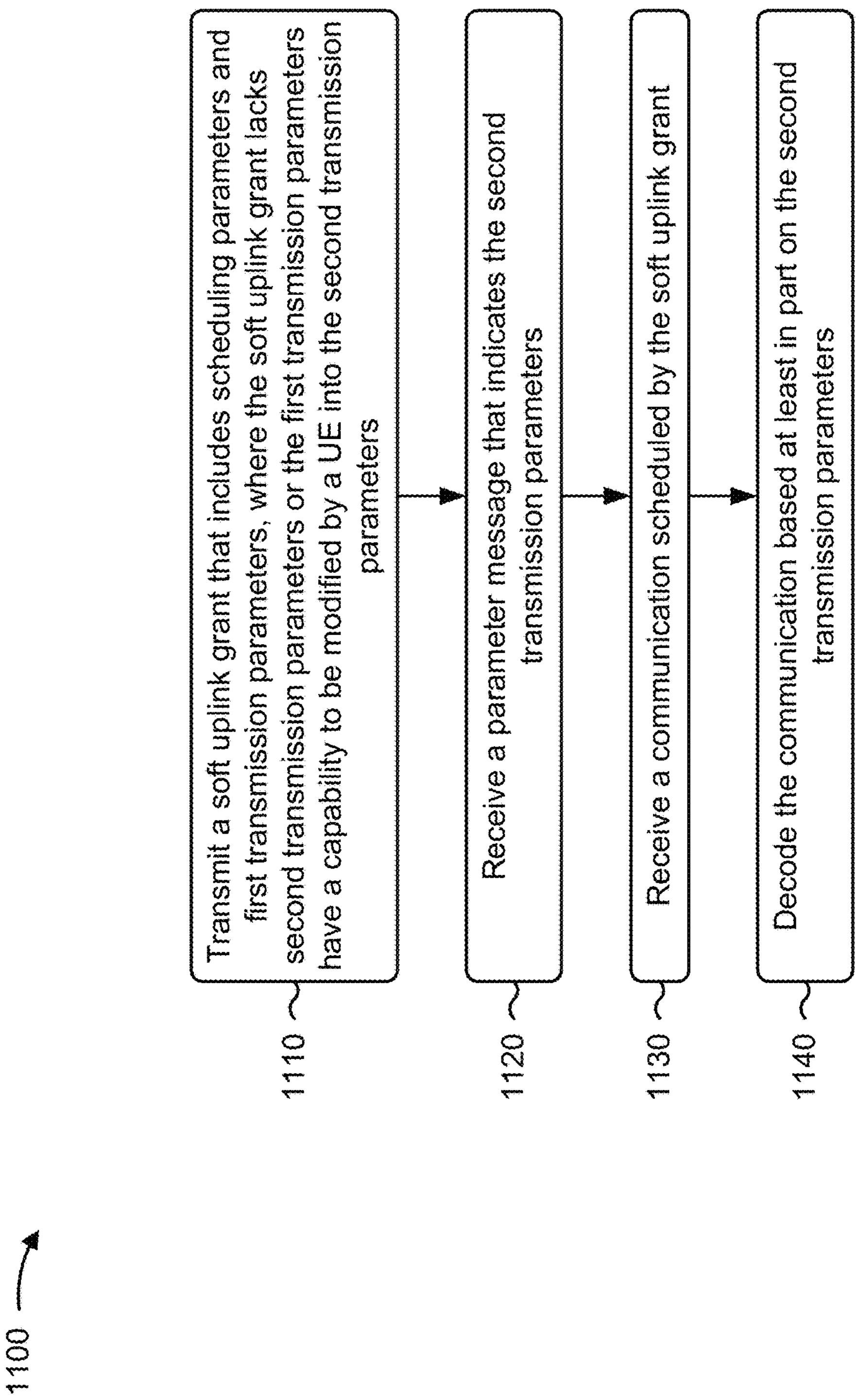
FIG. 11 is a diagram illustrating an example process performed, for example, by a network entity, in accordance with the present disclosure.

FIG. 11 is a diagram illustrating an example process 1100 performed, for example, by a network entity, in accordance with the present disclosure. Example process 1100 is an example where the network entity (e.g., base station 110, network entity 710) performs operations associated with providing a soft uplink grant.

As shown in FIG. 11, in some aspects, process 1100 may include transmitting a soft uplink grant that includes scheduling parameters and first transmission parameters, where the soft uplink grant lacks second transmission parameters or the first transmission parameters have a capability to be modified by a UE into the second transmission parameters (block 1110). For example, the network entity (e.g., using communication manager 1308 and/or transmission component 1304 depicted in FIG. 13) may transmit a soft uplink grant that includes scheduling parameters and first transmission parameters, where the soft uplink grant lacks second transmission parameters or the first transmission parameters have a capability to be modified by a UE into the second transmission parameters, as described above.

As further shown in FIG. 11, in some aspects, process 1100 may include receiving a parameter message that indicates the second transmission parameters (block 1120). For example, the network entity (e.g., using communication manager 1308 and/or reception component 1302 depicted in FIG. 13) may receive a parameter message that indicates the second transmission parameters, as described above.

As further shown in FIG. 11, in some aspects, process 1100 may include receiving a communication scheduled by the soft uplink grant (block 1130). For example, the network entity (e.g., using communication manager 1308 and/or reception component 1302 depicted in FIG. 13) may receive a communication scheduled by the soft uplink grant, as described above.

As further shown in FIG. 11, in some aspects, process 1100 may include decoding the communication based at least in part on the second transmission parameters (block 1140). For example, the network entity (e.g., using communication manager 1308 and/or decoding component 1310 depicted in FIG. 13) may decode the communication based at least in part on the second transmission parameters, as described above.

Process 1100 may include additional aspects, such as any single aspect or any combination of aspects described below and/or in connection with one or more other processes described elsewhere herein.

In a first aspect, transmitting the soft uplink grant includes transmitting the soft uplink grant in DCI that has a format that is associated with soft uplink grants.

In a second aspect, alone or in combination with the first aspect, process 1100 includes transmitting a configuration message that indicates the format that is associated with soft uplink grants.

In a third aspect, alone or in combination with one or more of the first and second aspects, transmitting the soft uplink grant includes transmitting the soft uplink grant in an RRC message that is configured for soft uplink grants.

In a fourth aspect, alone or in combination with one or more of the first through third aspects, process 1100 includes transmitting a configuration message that indicates parameters of the first transmission parameters that are modifiable by the UE.

In a fifth aspect, alone or in combination with one or more of the first through fourth aspects, process 1100 includes transmitting a configuration message that indicates a range, a condition, or a threshold for a modifiable parameter of the first transmission parameters.

In a sixth aspect, alone or in combination with one or more of the first through fifth aspects, process 1100 includes transmitting a configuration message that indicates a DCI format or an RRC configuration for soft uplink grants.

In a seventh aspect, alone or in combination with one or more of the first through sixth aspects, process 1100 includes transmitting a configuration message that activates or deactivates selection of the second transmission parameters.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
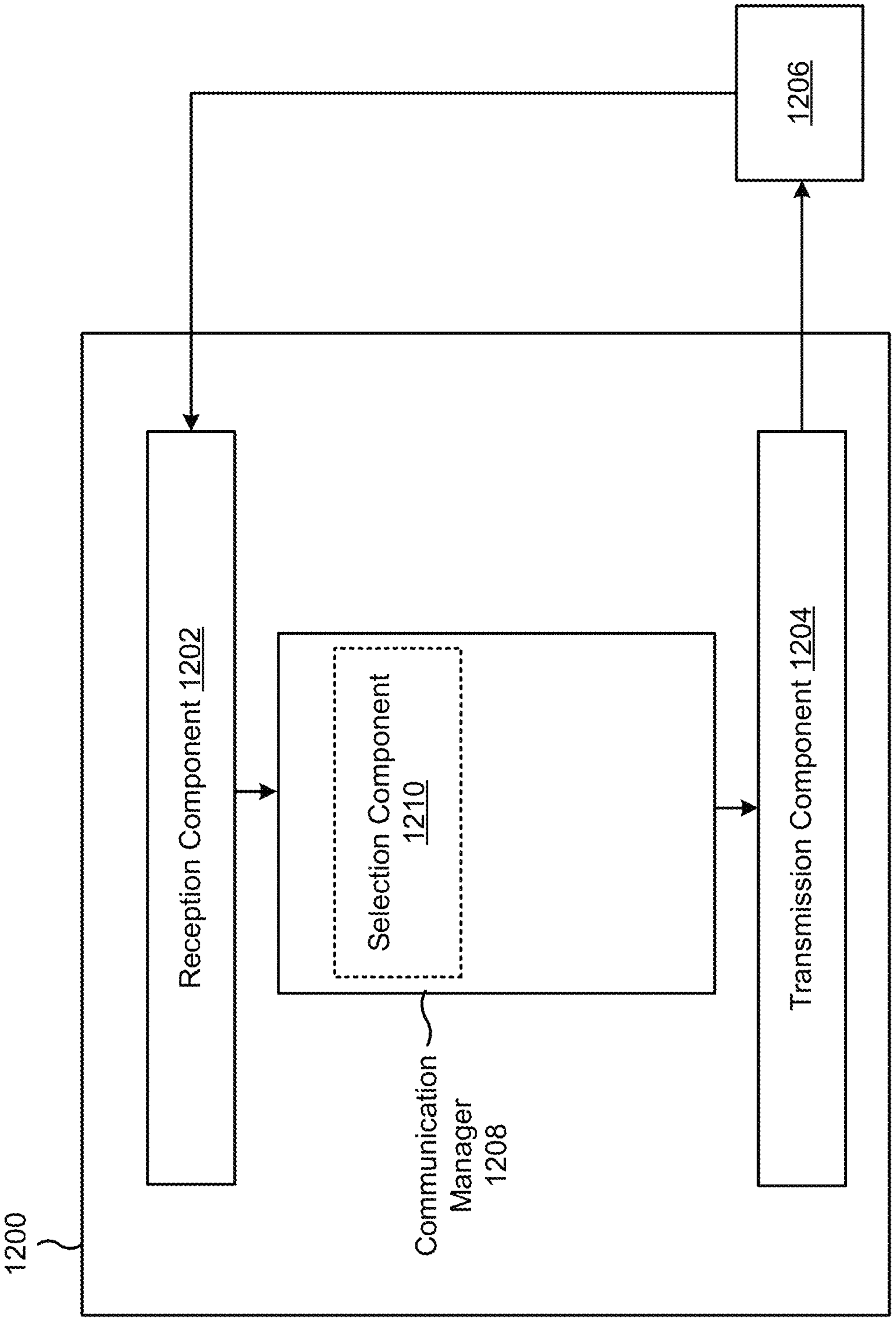
FIGS. 12-13 are diagrams of example apparatuses for wireless communication, in accordance with the present disclosure.

FIG. 12 is a diagram of an example apparatus 1200 for wireless communication. The apparatus 1200 may be a UE (e.g., a UE 120, UE 720), or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 1208. The communication manager 1208 may control and/or otherwise manage one or more operations of the reception component 1202 and/or the transmission component 1204. In some aspects, the communication manager 1208 may include one or more antennas, a modem, a controller/processor, a memory, or a combination thereof, of the UE described in connection with FIG. 2. The communication manager 1208 may be, or be similar to, the communication manager 140 depicted in FIGS. 1 and 2. For example, in some aspects, the communication manager 1208 may be configured to perform one or more of the functions described as being performed by the communication manager 140. In some aspects, the communication manager 1208 may include the reception component 1202 and/or the transmission component 1204. The communication manager 1208 may include a selection component 1210, among other examples.

In some aspects, the apparatus 1200 may be configured to perform one or more operations described herein in connection with FIGS. 1-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive an uplink grant that schedules a communication in a scheduled resource and that includes first transmission parameters associated with the scheduled resource. The selection component 1310 may select, in response to the uplink grant being a soft uplink grant, second transmission parameters that include new transmission parameters not included in the first transmission parameters or include modified first transmission parameters. The transmission component 1204 may transmit the communication in the scheduled resource or a subset of the scheduled resource using at least the second transmission parameters. The transmission component 1204 may transmit a message that indicates one or more of the second transmission parameters or the subset of the scheduled resource.

The reception component 1202 may receive a message that indicates the format that is associated with soft uplink grants. The reception component 1202 may receive a message that indicates parameters of the first transmission parameters that are modifiable by the UE. The reception component 1202 may receive a message that indicates a range, a condition, or a threshold for a modifiable parameter of the first transmission parameters. The reception component 1202 may receive a message that indicates a DCI format or an RRC configuration for soft uplink grants. The reception component 1202 may receive a message that activates or deactivates the selecting of the second transmission parameters.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
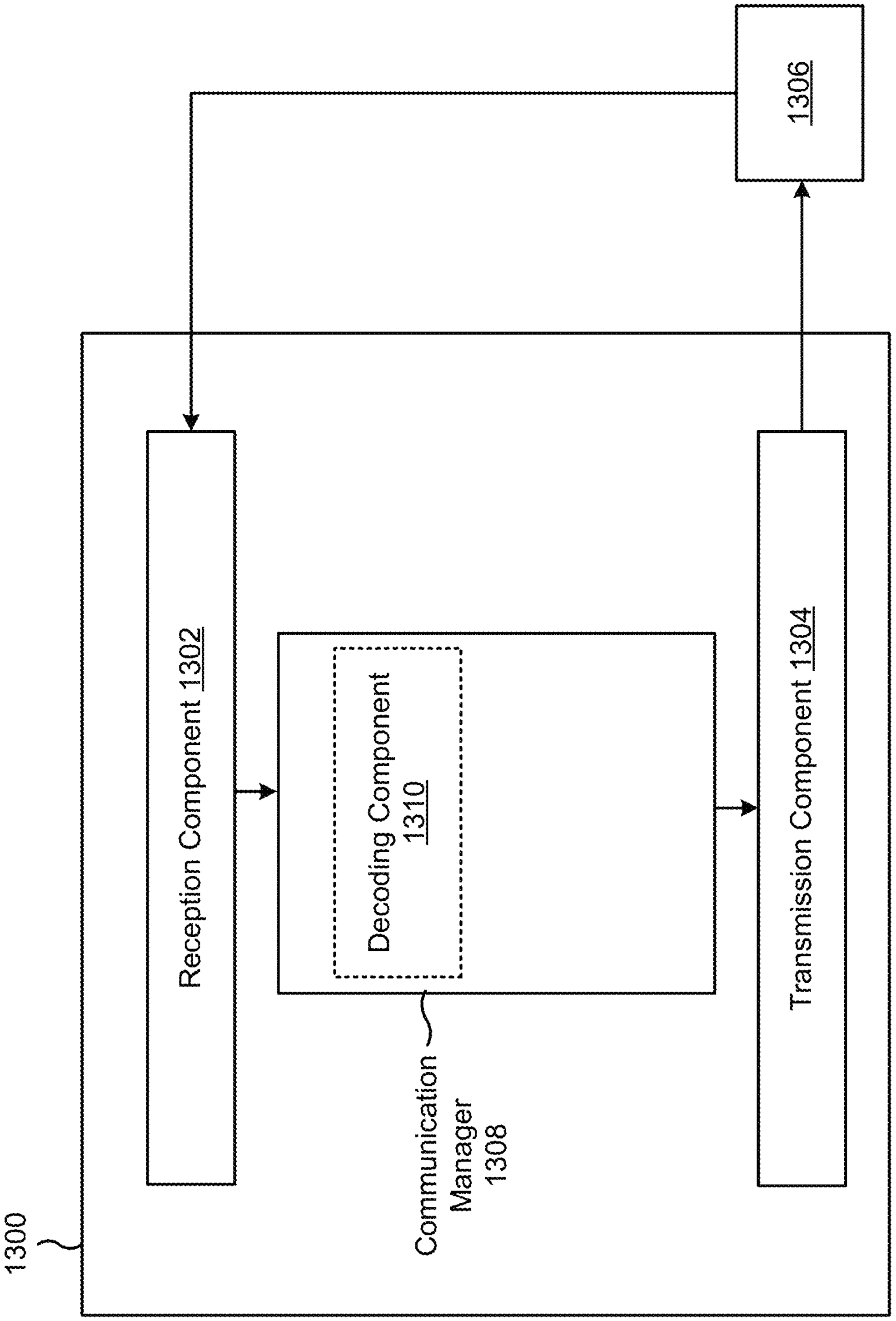

FIG. 13 is a diagram of an example apparatus 1300 for wireless communication. The apparatus 1300 may be a network entity (e.g., base station 110, network entity 710), or a network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1308. The communication manager 1308 may control and/or otherwise manage one or more operations of the reception component 1302 and/or the transmission component 1304. In some aspects, the communication manager 1308 may include one or more antennas, a modem, a controller/processor, a memory, or a combination thereof, of the network entity described in connection with FIG. 2. The communication manager 1308 may be, or be similar to, the communication manager 150 depicted in FIGS. 1 and 2. For example, in some aspects, the communication manager 1308 may be configured to perform one or more of the functions described as being performed by the communication manager 150. In some aspects, the communication manager 1308 may include the reception component 1302 and/or the transmission component 1304. The communication manager 1308 may include a decoding component 1310, among other examples.

In some aspects, the apparatus 1300 may be configured to perform one or more operations described herein in connection with FIGS. 1-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network entity described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network entity described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network entity described in connection with FIG. 2. In some aspects, the transmission component 1304 may be co-located with the reception component 1302 in a transceiver.

The transmission component 1304 may transmit a soft uplink grant that includes scheduling parameters and first transmission parameters, where the soft uplink grant lacks second transmission parameters or the first transmission parameters have a capability to be modified by a UE into the second transmission parameters. The reception component 1302 may receive a parameter message that indicates the second transmission parameters. The reception component 1302 may receive a communication scheduled by the soft uplink grant. The decoding component 1310 may decode the communication based at least in part on the second transmission parameters.

The transmission component 1304 may transmit a configuration message that indicates the format that is associated with soft uplink grants. The transmission component 1304 may transmit a configuration message that indicates parameters of the first transmission parameters that are modifiable by the UE. The transmission component 1304 may transmit a configuration message that indicates a range, a condition, or a threshold for a modifiable parameter of the first transmission parameters. The transmission component 1304 may transmit a configuration message that indicates a DCI format or an RRC configuration for soft uplink grants. The transmission component 1304 may transmit a configuration message that activates or deactivates selection of the second transmission parameters.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving an uplink grant that schedules a communication in a scheduled resource and that includes first transmission parameters associated with the scheduled resource; selecting, in response to the uplink grant being a soft uplink grant, second transmission parameters that include new transmission parameters not included in the first transmission parameters or include modified first transmission parameters; and transmitting the communication in the scheduled resource or a subset of the scheduled resource using at least the second transmission parameters.

Aspect 2: The method of Aspect 1, further comprising transmitting a message that indicates one or more of the second transmission parameters or the subset of the scheduled resource.

Aspect 3: The method of Aspect 2, wherein transmitting the message includes transmitting the message in uplink control information (UCI) in resources that are configured for indicating the second transmission parameters.

Aspect 4: The method of Aspect 2 or 3, wherein transmitting the message includes: skipping transmitting the message in UCI in response to the scheduled resource being smaller than resources for the UCI or smaller than a threshold amount of the resources for the UCI; or transmitting the message in the UCI in response to the scheduled resource being larger than the resources for the UCI or larger than the threshold amount of the resources for the UCI.

Aspect 5: The method of Aspect 2 or 3, wherein the UCI is configured based at least in part on one or more of an offset value for a payload size or a scaling factor for a coding rate, wherein the method further includes selecting the offset value based at least in part on a reliability requirement and selecting the scaling factor based at least in part on signaling overhead.

Aspect 6: The method of any of Aspects 2-5, wherein transmitting the message includes transmitting the message in a two-stage uplink control information (UCI), wherein a first stage of the UCI includes a first set of the second transmission parameters or an indication for a second set of the second transmission parameters in a second stage of the UCI.

Aspect 7: The method of any of Aspects 1-6, wherein the second transmission parameters include a modulation and coding scheme, a quantity of layers, a redundancy version, a new data indicator, a hybrid automatic repeat request number, a transmitted precoding matrix index, or a combination thereof.

Aspect 8: The method of any of Aspects 1-7, wherein the second transmission parameters include a carrier indicator, an uplink or supplementary uplink indicator, a bandwidth part indicator, a frequency hopping flag, a first or second downlink assignment index, a transmit power control value, a service request indicator, or a combination thereof.

Aspect 9: The method of any of Aspects 1-8, wherein the second transmission parameters include an indication of antenna ports, a sounding reference signal request, a channel state information request, code block group transmission information, demodulation reference signal information, or a combination thereof.

Aspect 10: The method of any of Aspects 1-9, wherein selecting the second transmission parameters includes modifying the first transmission parameters to obtain the modified first transmission parameters.

Aspect 11: The method of Aspect 10, wherein modifying the first transmission parameters includes modifying a hybrid automatic repeat request process number and a new data indicator in response to receiving a grant for a new transport block, and determining to retransmit a previously failed transport block.

Aspect 12: The method of Aspect 10 or 11, wherein modifying the first transmission parameters includes modifying a quantity or position of demodulation reference signals in response to a determination that channel state information is more accurate at the UE than at a network entity.

Aspect 13: The method of any of Aspects 1-12, wherein selecting the second transmission parameters includes inserting or modifying a density or position of a phase tracking reference signal.

Aspect 14: The method of any of Aspects 1-13, wherein selecting the second transmission parameters includes selecting a sounding reference signal to include in the scheduled resource.

Aspect 15: The method of any of Aspects 1-14, wherein selecting the second transmission parameters includes selecting a reference signal to include for peak-to-average-power ratio reduction or emission reduction.

Aspect 16: The method of any of Aspects 1-15, wherein selecting the second transmission parameters in response to the uplink grant being a soft uplink grant includes selecting the second transmission parameters in response to the uplink grant being received in downlink control information that has a format that is associated with soft uplink grants.

Aspect 17: The method of Aspect 16, further comprising receiving a message that indicates the format that is associated with soft uplink grants.

Aspect 18: The method of any of Aspects 1-17, wherein selecting the second transmission parameters in response to the uplink grant being a soft uplink grant includes selecting the second transmission parameters in response to the uplink grant being received in a radio resource control message that is configured for soft uplink grants.

Aspect 19: The method of any of Aspects 1-18, further comprising receiving a message that indicates parameters of the first transmission parameters that are modifiable by the UE.

Aspect 20: The method of any of Aspects 1-19, further comprising receiving a message that indicates a range, a condition, or a threshold for a modifiable parameter of the first transmission parameters.

Aspect 21: The method of any of Aspects 1-20, further comprising receiving a message that indicates a downlink control information format or a radio resource control configuration for soft uplink grants.

Aspect 22: The method of any of Aspects 1-21, further comprising receiving a message that activates or deactivates the selecting of the second transmission parameters.

Aspect 23: A method of wireless communication performed by a network entity, comprising: transmitting a soft uplink grant that includes scheduling parameters and first transmission parameters, wherein the soft uplink grant lacks second transmission parameters or the first transmission parameters have a capability to be modified by a user equipment (UE) into the second transmission parameters; receiving a parameter message that indicates the second transmission parameters; receiving a communication scheduled by the soft uplink grant; and decoding the communication based at least in part on the second transmission parameters.

Aspect 24: The method of Aspect 23, wherein transmitting the soft uplink grant includes transmitting the soft uplink grant in downlink control information that has a format that is associated with soft uplink grants.

Aspect 25: The method of Aspect 24, further comprising transmitting a configuration message that indicates the format that is associated with soft uplink grants.

Aspect 26: The method of any of Aspects 23-25, wherein transmitting the soft uplink grant includes transmitting the soft uplink grant in a radio resource control message that is configured for soft uplink grants.

Aspect 27: The method of any of Aspects 23-26, further comprising transmitting a configuration message that indicates parameters of the first transmission parameters that are modifiable by the UE.

Aspect 28: The method of any of Aspects 23-27, further comprising transmitting a configuration message that indicates a range, a condition, or a threshold for a modifiable parameter of the first transmission parameters.

Aspect 29: The method of any of Aspects 23-28, further comprising transmitting a configuration message that indicates a downlink control information format or a radio resource control configuration for soft uplink grants.

Aspect 30: The method of any of Aspects 23-29, further comprising transmitting a configuration message that activates or deactivates selection of the second transmission parameters.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

receive an uplink grant that schedules a communication in a scheduled resource and that includes first transmission parameters associated with the scheduled resource;

select, in response to the uplink grant being a soft uplink grant, second transmission parameters that include new transmission parameters not included in the first transmission parameters or include modified first transmission parameters;

transmit a message that indicates one or more of the second transmission parameters or a subset of the scheduled resource, wherein the message is transmitted in a two-stage uplink control information (UCI), and wherein a first stage of the two-stage UCI includes a first set of the second transmission parameters or an indication for a second set of the second transmission parameters in a second stage of the two-stage UCI;

transmit a second message that indicates one or more of the second transmission parameters or the subset of the scheduled resource, wherein the second message is transmitted in UCI in resources that are configured for indicating the second transmission parameters; and transmit the communication in the scheduled resource or the subset of the scheduled resource using at least the second transmission parameters.

2. The UE of claim 1, wherein the one or more processors, to transmit the second message, are configured to:

skip transmitting the second message in the UCI in response to the scheduled resource being smaller than resources for the UCI or smaller than a threshold amount of the resources for the UCI; or transmit the second message in the UCI in response to the scheduled resource being larger than the resources for the UCI or larger than the threshold amount of the resources for the UCI.

3. The UE of claim 1, wherein the UCI is configured based at least in part on one or more of an offset value for a payload size or a scaling factor for a coding rate, and wherein the one or more processors are configured to select the offset value based at least in part on a reliability requirement and select the scaling factor based at least in part on signaling overhead.

4. The UE of claim 1, wherein the second transmission parameters include a modulation and coding scheme, a quantity of layers, a redundancy version, a new data indicator, a hybrid automatic repeat request number, a transmitted precoding matrix index, or a combination thereof.

5. The UE of claim 1, wherein the second transmission parameters include a carrier indicator, an uplink or supplementary uplink indicator, a bandwidth part indicator, a frequency hopping flag, a first or second downlink assignment index, a transmit power control value, a service request indicator, or a combination thereof.

6. The UE of claim 1, wherein the second transmission parameters include an indication of antenna ports, a sounding reference signal request, a channel state information request, code block group transmission information, demodulation reference signal information, or a combination thereof.

7. The UE of claim 1, wherein the one or more processors, to select the second transmission parameters, are configured to modify the first transmission parameters to obtain the modified first transmission parameters.

8. The UE of claim 7, wherein the one or more processors, to modify the first transmission parameters, are configured to modify a hybrid automatic repeat request process number and a new data indicator in response to receiving a grant for a new transport block, and wherein the one or more processors are configured to determine to retransmit a previously failed transport block.

9. The UE of claim 7, wherein the one or more processors, to modify the first transmission parameters, are configured to modify a quantity or position of demodulation reference signals in response to a determination that channel state information is more accurate at the UE than at a network entity.

10. The UE of claim 1, wherein the one or more processors, to select the second transmission parameters, are configured to insert or modifying a density or position of a phase tracking reference signal.

11. The UE of claim 1, wherein the one or more processors, to select the second transmission parameters, are configured to select a sounding reference signal to include in the scheduled resource.

12. The UE of claim 1, wherein the one or more processors, to select the second transmission parameters, are configured to select a reference signal to include for peak-to-average-power ratio reduction or emission reduction.

13. The UE of claim 1, wherein the one or more processors, to select the second transmission parameters in response to the uplink grant being a soft uplink grant, are configured to select the second transmission parameters in response to the uplink grant being received in downlink control information that has a format that is associated with soft uplink grants.

14. The UE of claim 13, wherein the one or more processors are configured to receive a configuration message that indicates the format that is associated with soft uplink grants.

15. The UE of claim 1, wherein the one or more processors, to select the second transmission parameters in response to the uplink grant being a soft uplink grant, are configured to select the second transmission parameters in response to the uplink grant being received in a radio resource control message that is configured for soft uplink grants.

16. The UE of claim 1, wherein the one or more processors are configured to receive a configuration message that indicates parameters of the first transmission parameters that are modifiable by the UE.

17. The UE of claim 1, wherein the one or more processors are configured to receive a configuration message that indicates a range, a condition, or a threshold for a modifiable parameter of the first transmission parameters.

18. The UE of claim 1, wherein the one or more processors are configured to receive a configuration message that indicates a downlink control information format or a radio resource control configuration for soft uplink grants.

19. The UE of claim 1, wherein the one or more processors are configured to receive a configuration message that activates or deactivates selection of the second transmission parameters.

20. A network entity for wireless communication, comprising:

a memory; and one or more processors, coupled to the memory, configured to:

transmit a soft uplink grant that includes scheduling parameters and first transmission parameters, wherein the soft uplink grant lacks second transmission parameters or the first transmission parameters have a capability to be modified by a user equipment (UE) into the second transmission parameters;

receive a parameter message that indicates one or more of the second transmission parameters, wherein the parameter message is received in a two-stage uplink control information (UCI), and wherein a first stage of the UCI includes a first set of the second transmission parameters or an indication for a second set of the second transmission parameters in a second stage of the UCI;

receive a second parameter message that indicates one or more of the second transmission parameters, wherein the second parameter message is received in UCI in resources that are configured for indicating the second transmission parameters; and receive a communication scheduled by the soft uplink grant; and decode the communication based at least in part on the second transmission parameters.

21. The network entity of claim 20, wherein the one or more processors, to transmit the soft uplink grant, are configured to transmit the soft uplink grant in downlink control information that has a format that is associated with soft uplink grants.

22. The network entity of claim 21, wherein the one or more processors are configured to transmit a configuration message that indicates the format that is associated with soft uplink grants.

23. The network entity of claim 20, wherein the one or more processors, to transmit the soft uplink grant, are configured to transmit the soft uplink grant in a radio resource control message that is configured for soft uplink grants.

24. The network entity of claim 20, wherein the one or more processors are configured to transmit a configuration message that indicates parameters of the first transmission parameters that are modifiable by the UE.

25. The network entity of claim 20, wherein the one or more processors are configured to transmit a configuration message that indicates a range, a condition, or a threshold for a modifiable parameter of the first transmission parameters.

26. The network entity of claim 20, wherein the one or more processors are configured to transmit a configuration message that indicates a downlink control information format or a radio resource control configuration for soft uplink grants.

27. The network entity of claim 20, wherein the one or more processors are configured to transmit a configuration message that activates or deactivates selection of the second transmission parameters.

28. A method of wireless communication performed by a user equipment (UE), comprising:

receiving an uplink grant that schedules a communication in a scheduled resource and that includes first transmission parameters associated with the scheduled resource;

selecting, in response to the uplink grant being a soft uplink grant, second transmission parameters that include new transmission parameters not included in the first transmission parameters or include modified first transmission parameters;

transmitting a message that indicates one or more of the second transmission parameters or a subset of the scheduled resource, wherein the message is transmitted in a two-stage uplink control information (UCI), and wherein a first stage of the two-stage UCI includes a first set of the second transmission parameters or an indication for a second set of the second transmission parameters in a second stage of the two-stage UCI;

transmitting a second message that indicates one or more of the second transmission parameters or the subset of the scheduled resource, wherein the second message is transmitted in UCI in resources that are configured for indicating the second transmission parameters; and transmitting the communication in the scheduled resource or the subset of the scheduled resource using at least the second transmission parameters.

* * * * *